3,047,394
PHOTOSENSITIVE PRODUCTS CONTAINING THEREIN LAYERS HARDENED BY BIS-EPOXIDES

Charles F. H. Allen, Ralph H. Talbot, Joseph Yudelson, and Donald A. Smith, all of Rochester, N.Y., assignors to Eastman Kodak Company, Rochester, N.Y., a corporation of New Jersey
No Drawing. Filed Aug. 1, 1958, Ser. No. 752,402
5 Claims. (Cl. 96—111)

This invention relates to the hardening of photographic emulsion layers or of polymeric materials used for colloidal layers in photographic products, by incorporating bisepoxides in the compositions.

Various agents have been employed for hardening gelatin or other polymers such as are employed for photographic layers or as the carriers for silver halide in photographic emulsions. Some of these are formaldehyde, chrome salts, dialdehydes, hydroxyaldehydes, and the like. Some times one or the other of the compounds previously suggested for hardening purposes have disadvantages such as an effect on the sensitivity of the emulsion or other possible disadvantages.

One object of our invention is to provide for the hardening of polymeric materials used for photographic layers by incorporating bisepoxides in compositions thereof. Other objects of our invention will appear herein.

We have found that bisepoxide compounds have one of the formulas

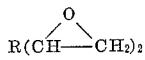

where R is a hydrocarbon group or a chain consisting of hydrocarbon groups connected by ether linkages,

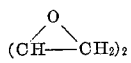

or

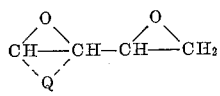

where Q represents the non-metallic atoms necessary to complete a hydrocarbon nucleus, when incorporated in polymeric coating compositions which are applied as a layer such as on a support, in the making of photographic products, harden the layer after aging for a short time. Some of the bisepoxide compounds which have been found to be useful as hardening agents for polymeric compounds are bis(2,3-epoxypropyl) ether, vinyl cyclohexene dioxide, ethylene bisglycidyl ether, bis(epoxypropoxyethyl) ether, hydroquinone bisglycidyl ether, resorcinol bisglycidyl ether, diepoxybutane, diepoxyhexane, or any other compound having a formula corresponding to one of those given above.

The polymeric compounds which may be hardened by bisepoxides in accordance with our invention are those containing at least 3 amono and/or carboxyl groups per polymeric unit. Many of these polymers have been used for forming coatings in the manufacture of photographic products or as the carriers for silver halide in photographic emulsions for example gelatin, cellulose ether phthalate and synthetic resins. Gelatin and dicarboxylic acid derivatives of gelatin are readily hardenable by incorporating bisepoxides therein in accordance with our invention. The cellulose ethyl ethers containing carboxyl groups, such as have been described in Talbot and MacCleary U.S. Patent No. 2,725,293, as being useful as carriers for silver halides in photographic emulsions are hardenable by means of bisepoxides in accordance with our invention, particularly those which have a phthalyl content of at least 20%. The light sensitivity of those photographic emulsions is often increased by the presence of the epoxy compound.

Various polymers containing at least 3 carboxyl groups per polymeric unit are useful for employment in the manufacture of photographic products and are hardenable in accordance with our invention. Examples of polymers of this type which have been hardened by bisepoxides are ammonium salts of poly(butyl acrylate co-acrylic acid), sodium salts of poly(methyl methacrylate co-methacrylic acid), sodium salts of phthalated polyvinyl alcohol, ammonium salts of phthalated gelatin, ammonium salts of phthalated polyvinyl alcohol, ammonium salts of polymers having the composition R′R(CH$_2$CHCOOH), R and R′ being butyl methacrylate, butyl acrylate or ethyl acrylate present in various amounts and in which the acrylic acid component is present in amounts ranging from 30 to 40 mole percent, ammonium salts of poly-(butyl acrylate-co-acrylonitrile-co-acrylic acid) etc. We have found that when bisepoxides are incorporated in amounts of 0.5–10% (based on the weight of polymer) in aqueous coatings in compositions containing one or more of these polymers and the compositions are coated out onto a surface so that hardening of the polymeric material will take place as evidenced after a short time by improved resistance to the effects of hot water and by appreciable increase in the melting point of the coating as compared with a coating of the same polymeric material in which no hardening agent has been incorporated.

The polymer layer after applying to a support is hardened by the bisepoxide upon standing or aging such as for at least 2 or 3 days at room temperature. With increase in temperature hardening results in a shorter time.

The following examples illustrate the hardening of polymeric materials as described above in the making of photographic products by incorporating bisepoxide compounds in the coating compositions employed:

Example 1

A gelatin-silver halide photographic composition was divided into 3 equal parts, to one of which no hardener was added. To the second was added 2% (based on gelatin) of ethylene bisglycidyl ether and to the third was added 2% (based on gelatin) of bis(epoxy-propoxyethyl)ether. The compositions were each coated on strips of support. The coatings on these strips were tested for melting point and for amount of swelling in water as indicated in the following table:

| Hardener (on wt. of gelatin in emulsion) | Age at 57% R.H., 77° F., days | M.P., ° C. | Swelling in water, 20° C.—15 minutes, percent gain in wt.[1] |
|---|---|---|---|
| 0.0 (control) | 1 | 33–34 | 392 |
|  | 8 | 34–36 | 387 |
|  | 15 |  | 385 |
|  | 35 |  | 407 |
| 2% ethylene bisglycidyl ether | 1 | 33–34 | 323 |
|  | 6 | 97 | 199 |
|  | 8 | 97 | ---- |
|  | 15 | 97 | 179 |
|  | 35 | 97 | 188 |
| 2% bis(epoxy propoxyethyl) ether | 1 | 33–34 | 318 |
|  | 6 | 97 | 186 |
|  | 8 | 97 | ---- |
|  | 15 | 97 | 178 |
|  | 35 | 97 | 181 |

[1] These values are based on total weight of silver halide and gelatin. They would be increased approximately twice if calculated on the amount of gelatin only.

The melting point of the layer is determined by immersing the support containing the layer in water and gradually increasing the temperature of the water. The point at which the layer dissolves in the water is termed the melting point.

The swelling in water is determined by placing the film strip in water at 20° C., for 15 minutes and determining the gain in weight based on the total weight of silver halide and gelatin.

Example 2

A gelatin-silver halide photographic emulsion was divided into 3 equal parts, to one of which no hardener was added. To the second, ethylene bisglycidyl ether was added and to the third bis(epoxypropoxyethyl)ether was added in the amounts indicated. These photographic emulsion compositions were coated out onto film base strips, the products were aged and tested as indicated. The results were as follows:

| Percent hardener (on wt. of gelatin) | Age at 50% R.H., days | M.P., °C. | Swelling in water, 20° C.—15 minutes (percent gain in wt.) |
| --- | --- | --- | --- |
| 0.0 (control) | 1 | 33–34 | 795 |
|  | 8 | 33–34 |  |
|  | 48 | 33–34 | 860 |
| 2.0% ethylene bisglycidyl ether | 1 | 35–37 | 656 |
|  | 8 | 97 | 397 |
|  | 48 | 97 | 350 |
| 2% bis(epoxypropoxyethyl) ether | 1 | 35–37 | 665 |
|  | 8 | 97 | 303 |
|  | 48 | 97 | 330 |

When a composition of gelatin containing 0.26% of formaldehyde based on the weight of the gelatin is coated out upon film base and aged for 21 days, testing of that strip shows melting of the coating at greater than 97° C. and swelling in water of 247%.

Example 3

120 grams of dry powdered ethyl cellulose phthalate suspended in 2880 ml. of distilled water was chilled to approximately 10° C. and 28% ammonium hydroxide was added dropwise until a clear solution resulted. The ethyl cellulose phthalate used as the starting material had a combined phthalyl content of 21.5% and a solvent viscosity of 8.4 cps. in 3% solution in 70–20–10 ethanol-isopropanol-n-butanol. A silver halide dispersion was added to 800 ccs. of the cellulose ether phthalate solution giving a photographic emulsion of high contrast characteristics. One 500 cc. portion of the emulsion was coated onto a subbed cellulose acetate film base while to another 500 cc. portion thereof one gram of bis(2,3-epoxypropoxyethyl)ether was added and this emulsion was also coated onto cellulose acetate film base. The films thus formed were aged one month at room temperature and each was subjected to treatment in developer 5 minutes, fixing bath 15 minutes, and water wash bath 20 minutes, in each case increasing the temperature. Samples, after development, after fixing and after washing were tested in water being heated and appreciable softening occurred when the temperatures reached 34°, 48° and 40° respectively whereas those containing bisepoxide hardeners were resistant to softening or dissolving even though the temperature of each bath was increased to a maximum of 200° C.

Example 4

To 10 ml. of a 7% solution of the ammonium salt of a poly(butyl acrylate co-acrylic acid) consisting of 85 mole percent of butyl acrylate and 15 mole percent of acrylic acid, 0.7 ml. of 4% acetone solution of bis(2,3-epoxypropyl)ether was added and the composition was coated onto a glass plate. The coating was aged at room temperature for 3 days. At the end of that time the coating was insoluble in hot water and in 2% ammonium hydroxide.

Example 5

To 10 ml. of a 7% solution of the sodium salt of a poly(methyl methacrylate co-methacrylic acid) consisting of equal quantities of methyl methacrylate and methacrylic acid, 0.7 ml. of a 4% acetone solution of bis(2,3-epoxypropyl) ether was added. The resulting composition was coated onto a glass plate. The coating after aging 4 days at 15% relative humidity and 75° F. temperature was insoluble in hot water, in 2% sulfuric acid and in 2% ammonium hydroxide. Coatings made with half the quantity of hardener were rendered insoluble while those made with ¼ of the amount of hardener prescribed although insoluble exhibited swelling in hot water.

Example 6

To 10 ml. of a 7% solution of the sodium salt of phthalated polyvinyl alcohol containing 5.7% of phthalyl there was added 0.7 ml. of a 4% solution of bis(2,3-epoxypropyl) ether. The coating was aged for 11 days at 50% relative humidity and 75° F. temperature. It was well hardened and showed little or no swelling in hot water, in hot dilute sulfuric acid or in hot dilute sodium hydroxide. The ammonium salt of phthalated polyvinyl alcohol was found to be hardened likewise. Coatings cast at a pH of 10 and at a pH of 6 hardened equally well. Coatings made with half the amount of hardener (2% of the weight of the polymer) also showed good hardening.

Example 7

To 10 ml. of a 7% solution of an ammonium salt of phthalated gelatin containing 7% by weight of phthalyl was added 0.7 ml. of a 4% acetone solution of bis(2,3-epoxypropyl) ether. The composition was coated out onto a glass plate and was aged for 9 days at 50% relative humidity and 75° F. temperature. The coating obtained was resistant to hot water.

Example 8

To 10 ml. of a 7% solution in water of an ammonium salt of maleated polyvinyl alcohol containing 4.4% of maleyl was added 0.7 ml. of a 4% acetone solution of bis(2,3-epoxypropyl) ether. The composition was coated out onto a glass plate and was aged 3 days at 50% relative humidity and 50° F. temperature. The coating was insoluble in hot water, dilute aqueous alkali, and dilute aqueous sulfuric acid.

Example 9

To 10 ml. of a 7% solution in water of an ammonium salt of cellulose ether phthalate was added 0.7 ml. of a 4% acetone solution of bis(2,3-epoxypropyl) ether. The resulting composition was coated out onto a glass plate and was aged for 3 days at 50% relative humidity and 75° F. temperature. The coating thus obtained was insoluble in hot water, in dilute sodium bicarbonate and in dilute aqueous sulfuric acid.

Example 10

Several solutions were prepared of 7% concentration of ammonium salts of polymers having the composition RR'($CH_2CHCOOH$), R' and R being butyl methacrylate, butyl acrylate, or ethyl acrylate, these being present in various amounts and the acrylic acid component being in an amount within the range of 30 to 40 mol percent. To each of several 10 ml. portions of these various solutions was added 0.7 ml. of 4% acetone solution of bis-(2,3-epoxypropyl) ether. The compositions were coated out onto glass strips and all were aged for one week at 30% relative humidity and 75° F. temperature. The coatings were all insoluble in hot water and in dilute aqueous ammonium hydroxide.

Example 11

To 10 ml. of a 7% solution of an ammonium salt of poly(butyl acrylate co-acrylonitrile co-acrylic acid) which consisted of 32 mol percent acrlyate, 50 mol percent of acrylonitrile, and 18 mol percent of acrylic acid was added 0.7 ml. of a 4% acetone solution of bis(2,3-epoxypropyl) ether. The composition was coated onto a glass plate and was aged for 3 days at 50% relative humidity and 75° F. temperature. The coating was insoluble in hot water, in dilute aqueous sodium hydroxide, and in dilute aqueous sulfuric acid.

*Example 12*

To 10 ml. of a composition as described in the preceding example, 0.7 ml. of a 4% solution of vinyl cyclohexene diepoxide was added. The composition was coated onto a glass plate. The layer thus obtained was aged 3 days at 50% relative humidity and 75° F. temperature. The coating was insoluble in hot water, dilute NaOH and dilute $H_2SO_4$.

*Example 13*

To 10 ml. of a dioxane solution of the acid form of the polymer described in Example 11 was added 0.7 ml. of a 4% acetone solution of bis(2,3-epoxypropyl) ether. The composition was coated onto a glass plate and was aged for 3 days at 50% relative humidity and 75° F. temperature. The coating was insoluble in hot water, dilute NaOH and dilute $H_2SO_4$.

*Example 14*

To 10 ml. of the composition described in Example 6 was added 0.02 gram of ethylene bisglycidyl ether. The composition was coated out onto a glass plate and was aged for 7 days at 50% relative humidity and 75° F. temperature. The coating was insoluble in hot water, in hot dilute sulfuric acid and in dilute ammonium hydroxide.

*Example 15*

To 10 ml. of the composition described in Example 6 was added 0.02 gram of bis (2,3-epoxypropoxyethyl) ether. The composition obtained was coated out onto a glass plate and was aged for 7 days at 50% relative humidity and 75° F. temperature. The coating was insoluble in hot water, in hot dilute sulfuric acid and in dilute ammonium hydroxide.

The epoxide may be added in the form of its aqueous solution or, if desired, some other solvent may be employed in admixture with the mater or it may be added in solution in a water-miscible solvent like acetone. If the epoxide solution is to be stored for a long period of time, it is preferable that it be made up in some other solvent than water. In the hardening of synthetic polymeric materials the best results have been obtained when at least three carboxyls are present per molecule of the polymer, while in the case of a natural polymer, such as a protein like gelatin, carboxyl groups need not be present. On the other hand, if the amount of carboxyl is very large such as greater than 20 carboxyls per molecule, susceptibility to swelling in water having some salt content therein may be observed. We have found that for coating compositions having a pH within the range of 5–9 the effective aging time is substantially uniform. When the pH is outside of this range, longer aging times may be required to obtain desired degrees of resistance to the action of hot water. The advantage of hardening in accordance with our invention is that water insoluble coatings are obtained under conditions which are very mild as regards temperature and humidity. Hence, the coatings can be hardened or insolubilized without any adverse effect on sensitive substances which might be present in the composition to be hardened.

This invention is particularly useful in hardening nitrogen containing polyvinyl alcohol polymers such as are described in U.S. application Serial No. 607,258 of Donald A. Smith and Cornelius C. Unruh, filed August 31, 1956. The following examples illustrate the use of my invention in connection with polymers of polyvinyl alcohol which have been modified to impart nitrogen content thereto.

*Example 16*

Ten milliliters of a polymer consisting of polyvinyl alcohol which had been modified so as to contain one mole percent of anthranilate groups was mixed with 0.30 milliliter of a 5% acetone solution of bis(2,3-epoxypropyl) ether. The polyvinyl alcohol polymer was prepared by reacting polyvinyl alcohol with a solution of isatoic anhydride in dimethyl formamide. The condensing of polyvinyl alcohol with isatoic anhydride is described in British Patent No. 503,752 whereby polyvinyl alcohol polymers containing anthranilate groups is formed.

The mixture of polymer and epoxide compound was coated onto glass plates and after drying was stored under room conditions for five days. The resulting coating was found to be soluble in hot water and in 2% aqueous sulphuric acid. The coating dissolved in hot 2% aqueous NaOH because of saponification of the anthranilate.

*Example 17*

10 milliliters of a 7% solution of a polymer consisting of polyvinyl alcohol which had been modified so as to contain one mole percent of anthranilate groups was mixed with 0.60 milliliter of a 5% acetone solution of vinyl cyclohexene dioxide. The mixture was coated onto glass plates. The coating which stood 11 days was insoluble in hot water and in 2% aqueous sulphuric acid. Hot 2% NaOH dissolved it.

*Example 18*

10 milliliters of a 7% solution of a polymer of polyvinyl alcohol modified so as to contain one mole percent of aminoacetal groups was mixed with 0.30 milliliter of bis(2,3-epoxypropyl) ether. The mixture was coated onto glass plates. After standing for 24 hours the coating was tested for solubility and was found to be insoluble in hot water, 2% aqueous sulphuric acid and 2% aqueous NaOH.

*Example 19*

10 milliliters of a 7% solution of a copolymer of vinyl alcohol and allylaminoacetamide, the preparation of which is described in application Serial No. 607,258 of Donald A. Smith and Cornelius C. Unruh, which product contained 3.4 mole percent of the amino containing group was mixed with 0.30 milliliter of a 5% acetone solution of bis(2,3-epoxypropyl) ether. The mixture was coated onto glass plates. The coating was aged for 6 days and was then tested for solubility. The coatings were insoluble in hot water, in 2% aqueous sulphuric acid and in 2% aqueous sodium hydroxide.

In each of the examples the best hardening is obtained when there is at least 3-amino (or carboxyl) groups per molecule of polymer which is mixed with the epoxide compound.

We claim:

1. A photosensitized product having therein a layer of a water soluble polymer containing carboxyl groups, containing as the hardener therein 0.5–10%, based on the weight of the polymer, of a water soluble bisepoxide selected from the group consisting of the following:

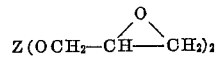

Z being selected from the group consisting of phenylene, alkylene and —R—O—R—,

R being a hydrocarbon group, and

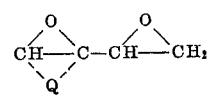

Q being selected from the group consisting of 2 hydrogens and the non-metallic atoms necessary to complete a hydrocarbon nucleus.

2. A gelatin-silver halide photographic emulsion containing as the hardener therein 0.5–10%, based on the weight of the gelatin, of a water soluble bisepoxide selected from the group consisting of the following:

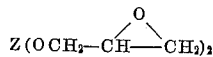

Z being selected from the group consisting of phenylene, alkylene and —R—O—R—,
R being a hydrocarbon group,
and

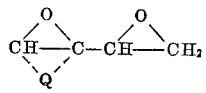

Q being selected from the group consisting of 2 hydrogens and the non-metallic atoms necessary to complete a hydrocarbon nucleus.

3. A silver-halide photographic emulsion containing as the vehicle for the silver halide a water soluble polymer containing carboxyl groups and as the hardener therein 0.5–10%, based on the weight of the polymer, of a water soluble bisepoxide selected from the group consisting of the following:

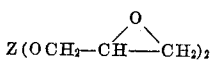

Z being selected from the group consisting of phenylene, alkylene and —R—O—R—,
R being a hydrocarbon group,
and

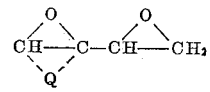

Q being selected from the group consisting of 2 hydrogens and the non-metallic atoms necessary to complete a hydrocarbon nucleus.

4. A photosensitized product having therein a layer of a gelatin-silver halide photographic emulsion containing therein ethylene bisglycidyl ether as the hardener for the gelatin.

5. A photosensitized product having therein a layer of a gelatin-silver halide photographic emulsion containing therein bis(epoxy-propoxy-ethyl) ether as the hardener for the gelatin.

References Cited in the file of this patent

UNITED STATES PATENTS

| | | |
|---|---|---|
| 2,139,774 | Sheppard et al. | Dec. 13, 1938 |
| 2,604,464 | Segall et al. | July 22, 1952 |
| 2,712,535 | Fisch | July 5, 1955 |
| 2,713,567 | Scheibli | July 19, 1955 |
| 2,784,128 | Schroeder | Mar. 5, 1957 |
| 2,829,053 | Weaver | Apr. 1, 1958 |
| 2,872,427 | Schroeder | Feb. 3, 1959 |
| 2,872,428 | Schroeder | Feb. 3, 1959 |
| 2,992,132 | Melamed | July 11, 1961 |